(12) United States Patent
Kumaraguru et al.

(10) Patent No.: US 9,647,279 B2
(45) Date of Patent: May 9, 2017

(54) SYSTEMS AND METHODS FOR MITIGATING CARBON CORROSION IN A FUEL CELL SYSTEM

(71) Applicant: GM GLOBAL TECHNOLOGY OPERATIONS LLC, Detroit, MI (US)

(72) Inventors: Swaminatha P. Kumaraguru, Troy, MI (US); Jeffrey A. Rock, Rochester Hills, MI (US); Balasubramanian Lakshmanan, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 303 days.

(21) Appl. No.: 14/275,731

(22) Filed: May 12, 2014

(65) Prior Publication Data

US 2015/0325872 A1    Nov. 12, 2015

(51) Int. Cl.
| | |
|---|---|
| H01M 8/04 | (2016.01) |
| H01M 8/06 | (2016.01) |
| H01M 8/04089 | (2016.01) |
| H01M 8/04746 | (2016.01) |
| H01M 8/04082 | (2016.01) |
| H01M 8/04223 | (2016.01) |
| H01M 8/0662 | (2016.01) |

(52) U.S. Cl.
CPC ... *H01M 8/04097* (2013.01); *H01M 8/04201* (2013.01); *H01M 8/04223* (2013.01); *H01M 8/04238* (2013.01); *H01M 8/04753* (2013.01); *H01M 8/04761* (2013.01); *H01M 8/0662* (2013.01); *H01M 2250/20* (2013.01)

(58) Field of Classification Search
CPC ............... H01M 8/04; H01M 8/04753; H01M 8/04201; H01M 8/04231; H01M 8/06; H01M 8/0662
See application file for complete search history.

(56) References Cited

U.S. PATENT DOCUMENTS

| | | | | |
|---|---|---|---|---|
| 4,877,506 A | * | 10/1989 | Fee | G01N 27/4071 204/242 |
| 2006/0051629 A1 | * | 3/2006 | Limbeck | H01M 4/92 429/429 |
| 2009/0023040 A1 | * | 1/2009 | Paik | H01M 8/04231 429/429 |
| 2013/0101873 A1 | * | 4/2013 | Dionne | F01K 27/02 429/9 |

* cited by examiner

*Primary Examiner* — Kenneth Douyette
(74) *Attorney, Agent, or Firm* — Phillips Ryther & Winchester; John P. Davis

(57) ABSTRACT

System and methods for reducing carbon corrosion in a fuel cell system are presented. Particularly, the disclosed systems and methods may be utilized in connection with preventing the formation of a propagating $H_2$-Air interface within the fuel cell system. In certain embodiments, the disclosed systems and methods may utilize an electrochemical pump disposed in a cathode loop of the fuel cell system configured to remove oxygen that intrudes into the fuel cell system. In further embodiments, pumps may be included in an anode and a cathode loop of the fuel cell system that may allow for circulation of certain gases to prevent the formation of an $H_2$-Air front with the system.

9 Claims, 5 Drawing Sheets

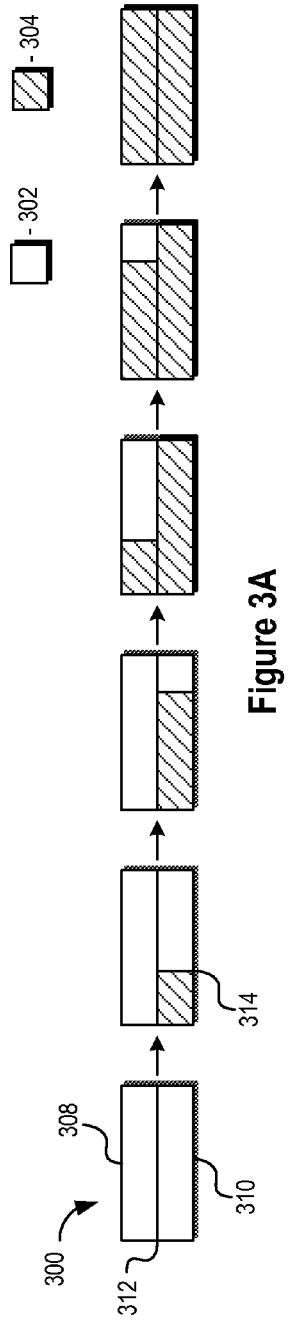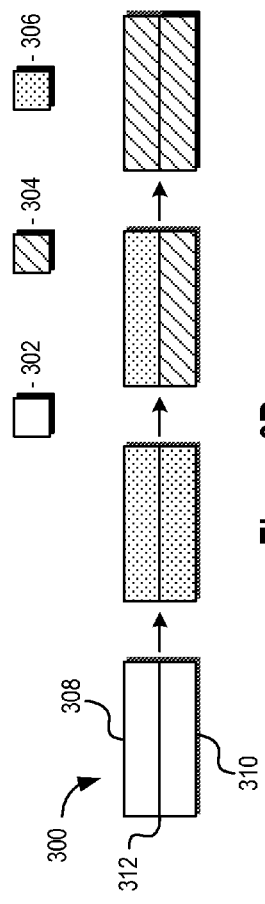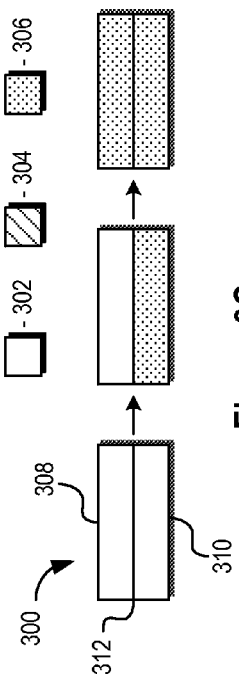
Figure 3A
Figure 3B
Figure 3C

US 9,647,279 B2

SYSTEMS AND METHODS FOR MITIGATING CARBON CORROSION IN A FUEL CELL SYSTEM

TECHNICAL FIELD

This disclosure relates to systems and methods for protecting a fuel cell system during startup and shutdown operations. More specifically, but not exclusively, this disclosure relates to systems and methods for mitigating carbon corrosion in proton exchange membrane fuel cell systems during startup and shutdown operations.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., using electric drive motors and the like) and/or via an intermediate battery system. Hydrogen is one possible fuel that may be used in a FC system. Hydrogen is a clean fuel that can be used to efficiently produce electricity in a FC. A hydrogen FC system is an electrochemical device that may include an electrolyte between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC-powered vehicles. A PEMFC generally includes a solid polymer electrolyte proton conducting membrane, such as a perfluorosulfonic acid membrane. An anode and cathode included in a PEMFC may include finely divided catalytic particles (e.g., platinum particles) supported on carbon particles and mixed with an ionomer. A catalytic mixture may be deposited on opposing sides of the membrane.

During certain operations of a PEMFC system (e.g., startup and shutdown operations), oxygen may slowly intrude into the fuel cell system causing an $H_2$-Air front to propagate from a cathode to an anode of the PEMFC system. In certain embodiments, this propagating front may cause undesirable carbon corrosion in the PEMFC system. Carbon corrosion in a PEMFC system may limit use of high surface area catalysts as carbon supports and may undesirably increase platinum loading.

SUMMARY

Systems and methods presented herein may be utilized in connection with mitigating carbon corrosion in a PEMFC system during startup and shutdown operations. As used herein, a PEMFC system may include a single cell or, alternatively, may include multiple cells arranged in a stack configuration. In some embodiments, a PEMFC system may include an anode compartment and a cathode compartment. The cathode compartment may be coupled to a cathode input line associated with a cathode loop of the PEMFC system. The anode compartment may be coupled to an anode input line associated with an anode loop of the PEMFC system.

A first pump may be coupled to the cathode line and be configured to selectively circulate one or more gases within the cathode compartment such as, for example $N_2$, configured to prevent formation of an $H_2$-Air interface within the cathode compartment. A second pump may be coupled to the anode line and be configured to selectively circulate one or more gases within the anode compartment configured to prevent formation of an $H_2$-Air interface within the anode compartment (e.g., $N_2$). A control system may control the operation of the first pump and the second pump. In further embodiments, an electrochemical oxygen pump may also be coupled to the cathode line configured to remove oxygen that intrudes into the PEMFC system. By preventing the formation of a propagating $H_2$-Air front and removing any oxygen that intrudes into the PEMFC system, carbon corrosion within the system may be mitigated.

In further embodiments, a method for mitigating carbon corrosion in a PEMFC system may include actuating a first pump coupled to a cathode input line in communication with a cathode compartment of the PEMFC system to circulate a first gas (e.g., $N_2$) within the cathode compartment configured to prevent formation of an $H_2$-air interface within the cathode compartment. Similarly, a second pump coupled to an anode input line in communication with an anode compartment of the PEMFC system may be actuated to circulate a second gas (e.g., $N_2$) within the anode compartment configured to prevent formation of an $H_2$-air interface within the anode compartment. An oxygen pump coupled to the cathode input line may also be actuated to remove oxygen that intrudes into the PEMFC system.

BRIEF DESCRIPTION OF THE DRAWINGS

Non-limiting and non-exhaustive embodiments of the disclosure are described, including various embodiments of the disclosure with reference to the figures, in which:

FIG. 3A illustrates a conceptual diagram of oxygen intrusion in a simplified PEMFC system consistent with embodiments disclosed herein.

FIG. 3B illustrates a conceptual diagram of a method for mitigating carbon corrosion in a PEMFC system consistent with embodiments disclosed herein.

FIG. 3C illustrates another conceptual diagram of a method for mitigating carbon corrosion in a PEMFC system consistent with embodiments disclosed herein.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Systems and methods provided herein may be utilized in connection with mitigating oxygen intrusion in a PEMFC system (e.g., oxygen intrusion during startup and shutdown operations of the PEMFC system). Mitigating such oxygen intrusion may reduce the occurrence of an $H_2$-Air front propagating from a cathode to an anode of the PEMFC system and associated carbon corrosion in the system. In certain embodiments, the disclosed systems and methods may utilize an electrochemical pump disposed in a cathode loop of a PEMFC system. The electrochemical pump may be configured to remove oxygen that intrudes into the PEMFC system. In further embodiments, pumps may be included in an anode and a cathode loop of the PEMFC system (e.g., miniature and/or low power pumps), that may be configured to provide for uniform gas flows in anode and/or cathode compartments of the PEMFC system. Such pumps may further allow for circulation of certain gases designed to prevent the formation of an $H_2$-Air front with the system.

Figure 1A:
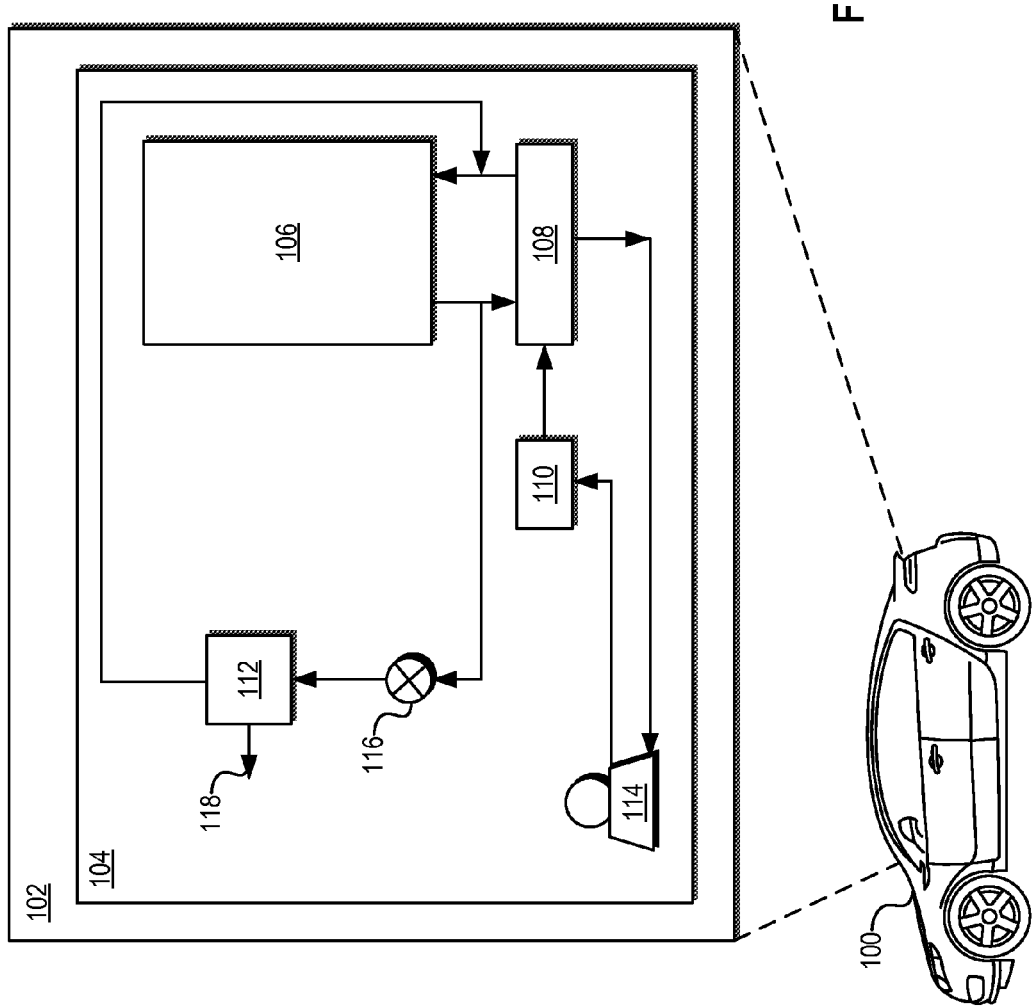
FIG. 1A illustrates a conceptual flow diagram of a cathode loop of a PEMFC system consistent with embodiments disclosed herein.

FIG. 1A illustrates a conceptual flow diagram of a cathode loop 104 of a PEMFC system 102 included in a vehicle 100 consistent with embodiments disclosed herein. The vehicle 100 may be a motor vehicle, a marine vehicle, an aircraft, and/or any other type of vehicle, and may include any suitable type of drivetrain for incorporating the systems and methods disclosed herein. Additional embodiments may apply the teachings of the present disclosure to stationary FC systems (e.g., generators). As illustrated, vehicle 100 may include a PEMFC system 102 configured to provide electrical power to certain components of the vehicle 100. For example, the PEMFC system 102 may be configured to provide power to electric drivetrain components of the vehicle 100.

In some embodiments, the PEMFC system 102 may be configured to directly provide power to electric drivetrain components. In certain embodiments, the PEMFC system 102 may be configured to provide power to electric drivetrain components via an intermediate battery system. In further embodiments, the PEMFC system 102 may be configured to provide power to one or more other battery systems including low voltage battery systems (e.g., lead-acid 12V automotive batteries) that supply electric energy to a variety of vehicle 100 systems including, for example, electric coolant pumps, lighting systems, audio systems, and/or the like.

The PEMFC system 102 may include a single cell or multiple cells arranged in a PEMFC stack 106 configuration, and may include certain PEMFC system elements and/or features described above. In some embodiments, the PEMFC stack 106 may receive a cathode input gas that may comprise oxygen or air. During operation, a portion of the cathode input gas (e.g., oxygen) may not be consumed by the PEMFC stack 106 and may thus be output as a cathode exhaust gas that may include water. Water included in the cathode exhaust gas may comprise water vapor and/or liquid water. In certain embodiments, this water may be captured by a water vapor transfer ("WVT") unit 108 in communication with the PEMFC stack 106.

In some embodiments, water captured by the WVT unit 108 may be utilized in connection with humidifying cathode input airflow. In some embodiments, cathode net air may be cooled using a charge air cooler ("CAC") 110 in communication with the WVT unit 108 prior to net air being transferred to the WVT unit 108. In further embodiments, cooling net air using the CAC 110 may allow the air to be at a better temperature for facilitating water vapor transfer.

Input and/or exhaust gases may be circulated in the illustrated PEMFC system 102 using one or more pumps. In certain embodiments, a compressor and expander module 114 may be in communication with the WVT unit 108, the CAC 110, and/or other components of the cathode loop 104 and be configured to circulate certain gases (e.g., inlet air and/or hydrogen and/or outlet gases) associated with the PEMFC stack 106 and/or related systems (e.g., WVT unit 108, CAC 110).

In some embodiments, the PEMFC system 102 may include an oxygen pump 112 disposed in the cathode loop 104. In certain embodiments, the oxygen pump 112 may be utilized to remove oxygen 118 that intrudes into the PEMFC system 102 (e.g., during startup and shutdown operations of the PEMFC system 102). As discussed above, intrusion of oxygen into the PEMFC system 102 may lead to the occurrence of $H_2$-Air front/interface propagating from a cathode to an anode of the PEMFC system 102. This propagating front may lead to carbon corrosion within certain materials of the PEMFC system 102. Consistent with embodiments disclosed herein, by removing oxygen 118 that intrudes into the PEMFC system 102, the oxygen pump 112 may mitigate the development of a propagating $H_2$-Air front, thereby reducing carbon corrosion within the PEMFC system 102.

The oxygen pump 112 may comprise an electrochemical oxygen pump, although other suitable types of oxygen pumps and/or oxygen removal devices may also be utilized in connection with the disclosed embodiments. In some embodiments, the oxygen pump 112 may be powered by a low voltage electrical system of the vehicle 100 (e.g., a 12V electrical system or the like). In further embodiments, the oxygen pump 112 may comprise an 8-cell electrochemical oxygen pump, although electrochemical pumps having any suitable number of cells may also be utilized.

In further embodiments, a first pump 116 may be in communication with the cathode loop 104 and be configured to circulate gases in the cathode loop 104. Such circulation may, among other things, mitigate the formation of an $H_2$-Air front in a cathode compartment of the PEMFC stack 106, thereby reducing carbon corrosion within the PEMFC system 102. For example, as discussed below, the first pump 116 may be configured to circulate $H_2$, $N_2$, and/or air (e.g., oxygen) in connection with mitigating the formation of an $H_2$-Air front in a cathode compartment of the PEMFC stack 106 (e.g., during startup and/or shutdown operations of the PEMFC system 102). In certain embodiments, the first pump 116 may comprise a relatively small and/or miniaturized pump and be configured to consume relatively little power during operation. In some embodiments, the first pump 116 may be powered by a low voltage electrical system of the vehicle 100 (e.g., a 12V electrical system or the like).

The PEMFC system 102 and/or associated systems (e.g., first pump 116, oxygen pump 112, WVT unit 108, CAC 110, and/or compressor and expander module 114) may be communicatively coupled with an associated a control system (not shown). The control system may be configured to monitor and control certain operations of the PEMFC system 102 and/or associated systems. For example, the control system may be configured to monitor and control startup, shutdown, charging, and/or discharging operations of the FC system 102. Similarly, the control system may be configured to monitor and/or control operations of the first pump 116 and/or oxygen pump 112 during startup and shutdown operations in connection with embodiments of the disclosed systems and methods. In further embodiments, an internal vehicle computer system (not shown) and/or any other suitable computer system may be configured to monitor and control certain operations of the PEMFC system 102 and/or associated systems.

Figure 1B:
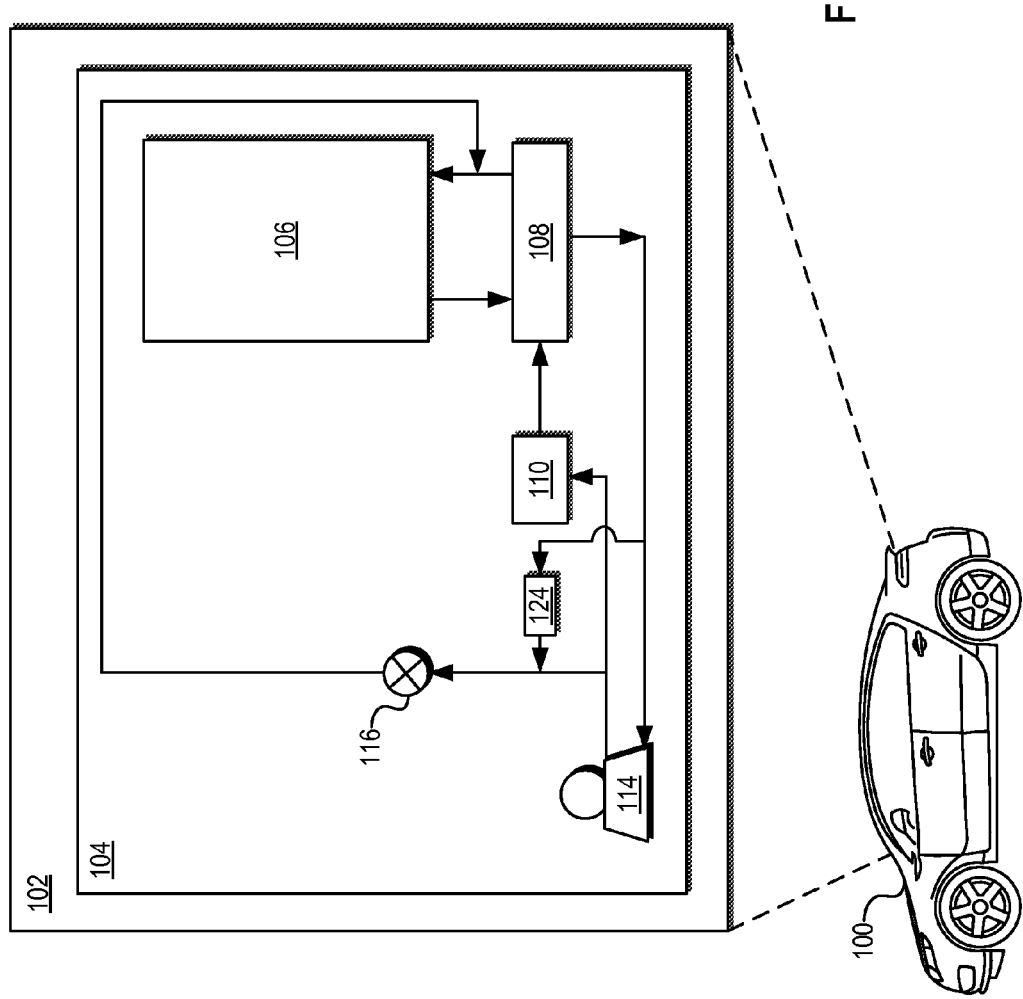
FIG. 1B illustrates another conceptual flow diagram of a cathode loop of a PEMFC system consistent with embodiments disclosed herein.

FIG. 1B illustrates another conceptual flow diagram of a cathode loop of a PEMFC system consistent with embodiments disclosed herein. Certain illustrated elements may be similar to elements illustrated in and described in reference to FIG. 1A and, accordingly, similar elements may be denoted with like numerals. In certain embodiments, a first pump 116 may be disposed in the cathode loop 104. A stack bypass valve 124 may be disposed in connection with a bypass loop associated with the WVT unit 108, CAC 110, and/or compressor and expander module 114. In certain embodiments, the first pump 116 and the stack bypass valve may be controlled by a suitable system to control an amount of recirculation flow in the cathode loop 104 so as to vary a ratio of recirculation flow to fresh air in the cathode loop 104.

Figure 2:
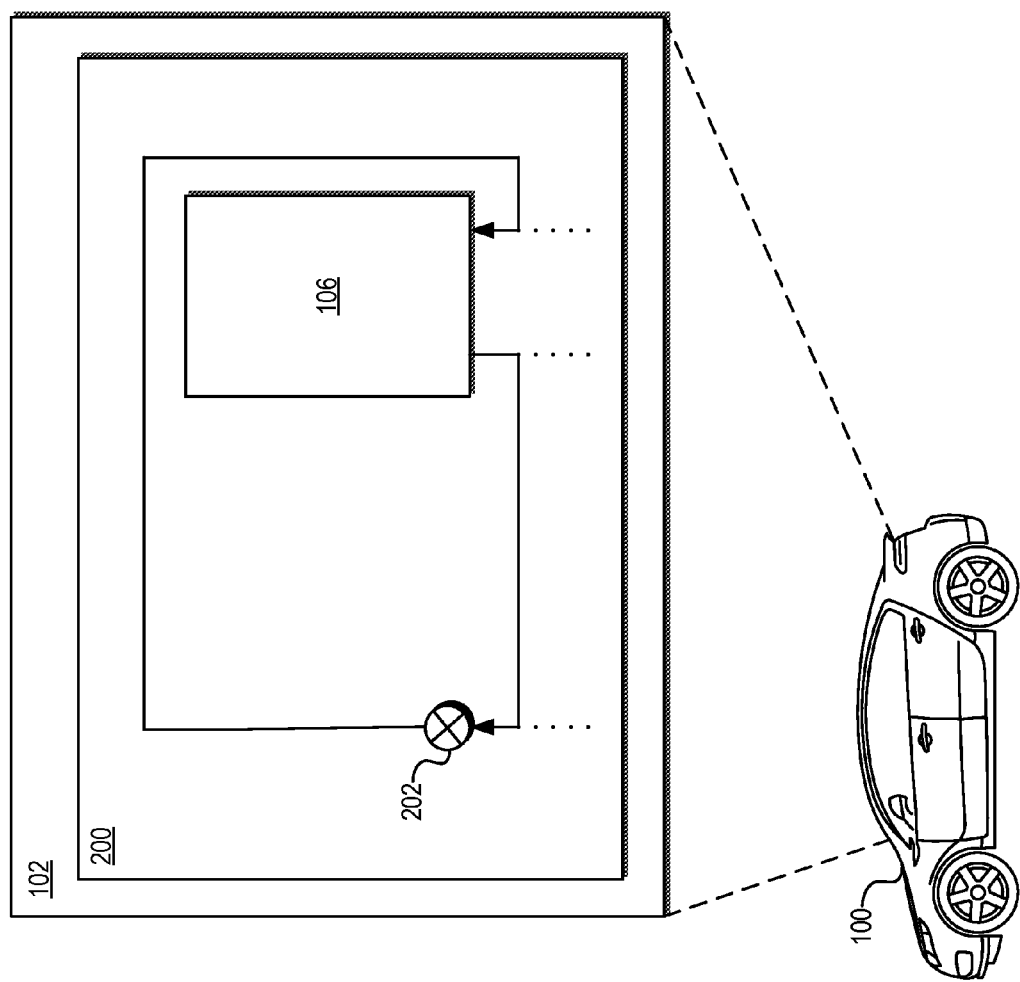
FIG. 2 illustrates a conceptual flow diagram of an anode loop of a PEMFC system consistent with embodiments disclosed herein.

FIG. 2 illustrates a conceptual flow diagram of an anode loop 200 of a PEMFC system 102 included in a vehicle 100 consistent with embodiments disclosed herein. Certain elements of the exemplary PEMFC system 102 may be similar to those illustrated in and described in reference to FIGS. 1A-1B, and, accordingly, similar elements may be denoted with like numerals. As illustrated, in some embodiments, a second pump 202 may be in communication with the anode loop 200 configured to circulate gases in the anode loop 200. Such circulation may, among other things, mitigate the formation of an $H_2$-Air front in an anode compartment of the PEMFC stack 106, thereby reducing carbon corrosion within the PEMFC system 102. For example, as discussed below, the second pump 202 may be configured to circulate $H_2$, $N_2$, and/or air (e.g., oxygen) in connection with mitigating the formation of an $H_2$-Air front in a cathode compartment of the PEMFC stack 106 (e.g., during startup and/or shutdown operations of the PEMFC system 102). In certain embodiments, the second pump 202 may comprise a relatively small and/or miniaturized pump and be configured to consume relatively little power during operation. In some embodiments, the second pump 202 may be powered by a low voltage electrical system of the vehicle 100 (e.g., a 12V electrical system or the like).

FIG. 3A illustrates a conceptual diagram of oxygen intrusion in a simplified PEMFC system 300 consistent with embodiments disclosed herein. Particularly, the illustrated simplified system 300 comprises a single cell, although it will be appreciated that embodiments disclosed herein may be utilized in connection with a PEMFC system comprising any number of cells. The simplified PEMFC system 300 may comprise an anode compartment 308, a cathode compartment 310, and a proton exchange membrane 312 disposed therebetween.

As illustrated, under certain conditions (e.g., startup and/or shutdown operations of the PEMFC system 300), air 304 (e.g., oxygen) may intrude into the PEMFC system 300. Such intrusion may create an $H_2$-Air front 314 at an interface of the intruded air 304 and $H_2$ 302 in the system 300 that propagates from a cathode compartment 310 to an anode compartment 308 of the PEMFC system 300. This propagating front 314 may lead to carbon corrosion within certain materials of the PEMFC system 300. Accordingly, as discussed below in reference to FIGS. 3B-3C, embodiments disclosed herein may utilize an electrochemical pump disposed in a cathode loop of the PEMFC system 300 configured to remove oxygen that intrudes into the system 300. Moreover, one or more pumps may be included in the anode and/or cathode loops that may be configured to circulate gases designed to prevent the formation of the $H_2$-Air front 314 with the system 300.

FIG. 3B illustrates a conceptual diagram of a method for mitigating carbon corrosion in a PEMFC system 300 consistent with embodiments disclosed herein. Certain elements illustrated in FIG. 3B may be similar to those illustrated in and described in reference to FIG. 3A, and, accordingly, similar elements may be denoted with like numerals.

As discussed above, in some embodiments, one or more pumps (e.g., low-power miniature pumps) in communication with a cathode loop and/or an anode loop of a PEMFC system 300 may be configured to circulate certain gases (e.g., $H_2$ 302, air 304, and/or $N_2$ 306) in connection with mitigating the formation of an $H_2$-Air front propagating from a cathode compartment 310 to an anode compartment 308 of the PEMFC system 300. For example, as illustrated, the one or more pumps may circulate $N_2$ 306 in the cathode compartment 310 and the anode compartment 308 of the PEMFC system 300 (i.e., replacing and/or substantially replacing $H_2$ 302 disposed in both compartments 308, 310). Once the cathode compartment 310 and the anode compartment 308 substantially contain $N_2$ 306, air 304 may be circulated in the cathode compartment 310 by a pump associated with the cathode loop. Similarly, air 304 may be circulated in the cathode compartment 308 by a pump associated with the anode loop. By first circulating $N_2$ 306 into the anode and cathode compartments 308, 310 prior to circulating air 304, the formation of a propagating $H_2$-Air front may be prevented, thereby mitigating carbon corrosion in the PEMFC system 300.

FIG. 3C illustrates another conceptual diagram of a method for mitigating carbon corrosion in a PEMFC system 300 consistent with embodiments disclosed herein. Certain elements illustrated in FIG. 3C may be similar to those illustrated in and described in reference to FIGS. 3A-3B, and, accordingly, similar elements may be denoted with like numerals.

As discussed above, in some embodiments, one or more pumps (e.g., low-power miniature pumps) in communication with a cathode loop and/or an anode loop of a PEMFC system 300 may be configured to circulate certain gases (e.g., $H_2$ 302, air 304, and/or $N_2$ 306) in connection with mitigating the formation of an $H_2$-Air front propagating from a cathode compartment 310 to an anode compartment 308 of the PEMFC system 300. In further embodiment, an electrochemical oxygen pump may be included in a cathode loop of the system 300 configured to remove oxygen that intrudes Into the PEMFC system 300 (e.g., during startup and shutdown operations). For example, as illustrated, a pump associated with the cathode loop may circulate $N_2$ 306 in the cathode compartment 310. Similarly, a pump associated with the anode loop may circulate $N_2$ 306 in the anode compartment 308. Any oxygen (e.g., air) that intrudes into the system 300 may be removed by the electrochemical oxygen pump included in the cathode loop of the system 300. In this manner, the formation of a propagating $H_2$-Air front may be prevented, thereby mitigating carbon corrosion in the PEMFC system 300.

Figure 4:
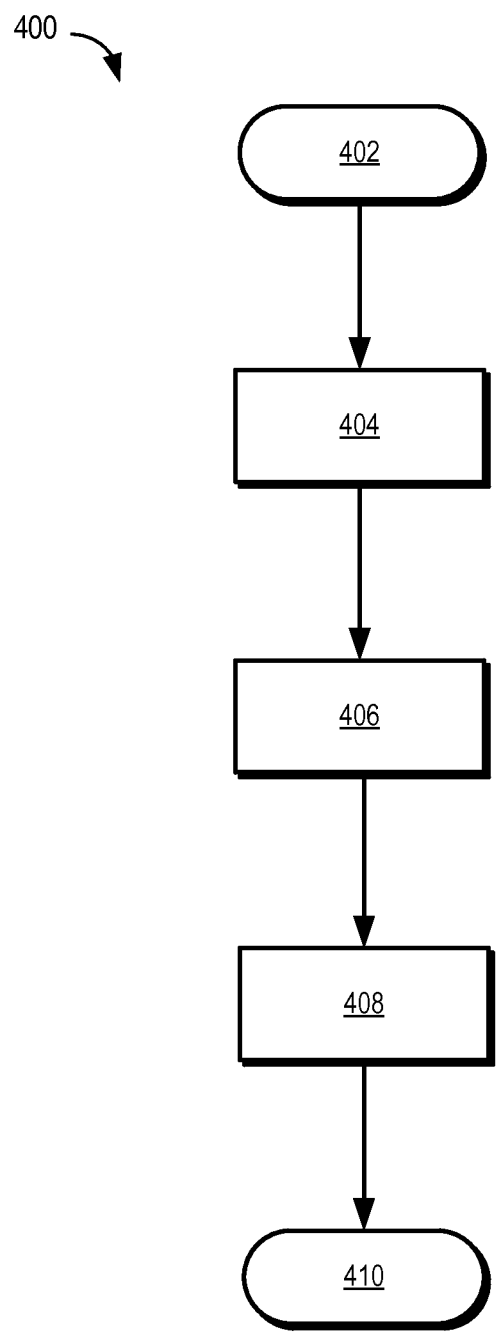
FIG. 4 illustrates a flow chart of an exemplary method for mitigating carbon corrosion in a PEMFC system consistent with embodiments disclosed herein.

FIG. 4 illustrates a flow chart of an exemplary method 400 for mitigating carbon corrosion in a PEMFC system consistent with embodiments disclosed herein. The illustrated method 400 may be performed using, at least in part, a control system, one or more pumps (e.g., low power miniaturized pumps), and/or an electrochemical oxygen pump, although other suitable systems and/or combination of systems may also be utilized.

The method 400 may begin at 402. In certain embodiments, the method 400 may initiate during a startup and/or a shutdown operation of the PEMFC system. At 404, a first pump coupled to a cathode input line (e.g., an input line included in a cathode loop) in communication with a cathode compartment of the PEMFC system may be actuated. In certain embodiments, actuating the first pump may cause a first gas to circulate within the cathode compartment configured to prevent formation of an $H_2$-Air interface within the cathode compartment.

At 406, a second pump coupled to an anode input line (e.g., an input line included in an anode loop) in communication with an anode compartment of the PEMFC system may be actuated. Actuating the second pump may cause a second gas to circulate within the anode compartment configured to prevent formation of an $H_2$-air interface within the cathode compartment. In certain embodiments, the first gas and/or the second gas may comprise $N_2$, although other suitable gases configured to prevent formation of an $H_2$-Air interface may also be utilized.

At 408, an electrochemical oxygen pump coupled to the cathode input line may be actuated so as to remove any oxygen that intrudes into the PEMFC system. By preventing the formation of a propagating $H_2$-Air front and removing any oxygen that intrudes into the PEMFC system, carbon corrosion within the system may be mitigated. The method may proceed to end at 410.

Certain systems and methods disclosed herein may be implemented, at least in part, using one or more computer systems. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. For example, in certain embodiments, the systems and methods disclosed herein may be utilized in FC systems not included in a vehicle (e.g., as in back-up power sources or the like). It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "in communication," "coupled," "coupling," and any other variation thereof are intended to encompass a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
a fuel cell system comprising an anode compartment and a cathode compartment;
a cathode line coupled to the cathode compartment;
an anode line coupled to the anode compartment;

a first pump coupled to the cathode line configured to selectively circulate one or more gases within the cathode compartment configured to prevent formation of an $H_2$-air interface within the cathode compartment;

a second pump coupled to the anode line configured to selectively circulate one or more gases within the anode compartment configured to prevent formation of an $H_2$-air interface within the anode compartment;

an oxygen pump coupled to the cathode line configured to selectively remove residual oxygen from the fuel cell system; and a control system in communication with the first pump, the second pump, and the oxygen pump programmed to control the operation of the first pump, the second pump, and the oxygen pump, wherein the control system is programmed to control the operation of the first pump and the second pump by:

actuating the first pump and the second pump to circulate $N_2$ within the cathode compartment and the anode compartment; and subsequently actuating the first pump and the second pump to circulate air within the cathode compartment and the anode compartment.

2. The system of claim 1, wherein the one or more gases comprise at least one of air, $H_2$, and $N_2$.

3. The system of claim 1, wherein the control system is configured to control of the operation of the first pump, the second pump, and the oxygen pump by:

actuating the oxygen pump to remove the residual oxygen from the fuel cell system compartment.

4. The system of claim 1, wherein the oxygen pump comprises an electrochemical oxygen pump.

5. The system of claim 4, wherein the electrochemical oxygen pump comprises a 12 volt 8-cell electrochemical oxygen pump.

6. The system of claim 1, wherein the fuel cell system comprises a proton exchange membrane fuel cell system.

7. The system of claim 1, wherein the control system is configured to control the operation of the first pump and the second pump during startup of the fuel cell system.

8. The system of claim 1, wherein the control system is configured to control the operation of the first pump and the second pump during shutdown of the fuel cell system.

9. The system of claim 1, wherein the fuel cell system is configured to power a drivetrain system of a vehicle.

* * * * *